Figure 1:
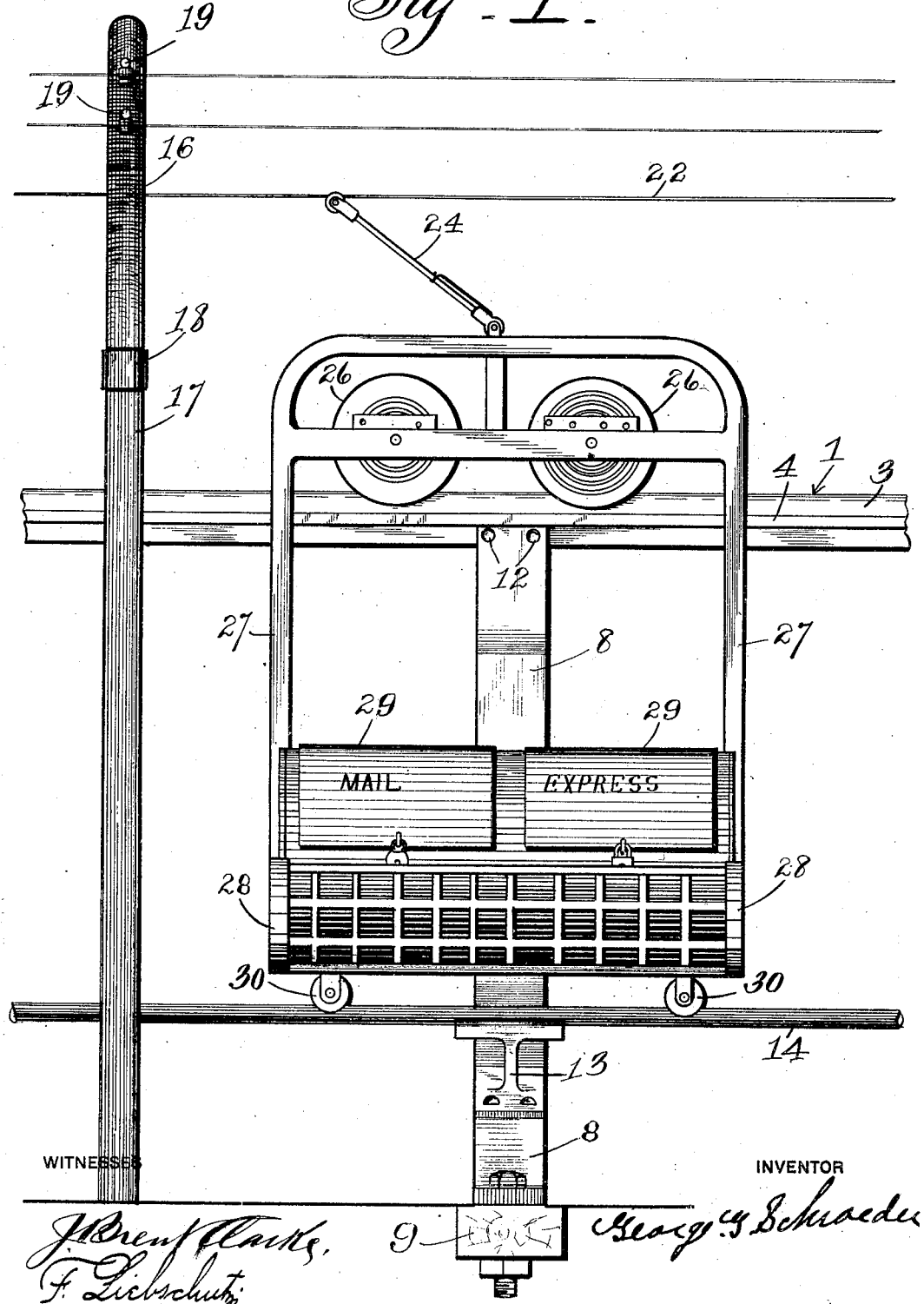

No. 836,405. PATENTED NOV. 20, 1906.
G. G. SCHROEDER.
ELEVATED ELECTRIC TRAMWAY.
APPLICATION FILED AUG. 7, 1906.

5 SHEETS—SHEET 4.

Witnesses
J. Brent Clarke
F. Liebschutz

Inventor
George G. Schroeder

No. 836,405. PATENTED NOV. 20, 1906.
G. G. SCHROEDER.
ELEVATED ELECTRIC TRAMWAY.
APPLICATION FILED AUG. 7, 1906.

5 SHEETS—SHEET 5.

Witnesses
J. Brent Clarke,
F. Liebschutz

Inventor
George G. Schroeder

UNITED STATES PATENT OFFICE.

GEORGE G. SCHROEDER, OF WASHINGTON, DISTRICT OF COLUMBIA, ASSIGNOR TO INDUSTRIAL MOTOR COMPANY, A CORPORATION OF THE DISTRICT OF COLUMBIA.

ELEVATED ELECTRIC TRAMWAY.

No. 836,405.　　　Specification of Letters Patent.　　　Patented Nov. 20, 1906.

Application filed August 7, 1906. Serial No. 329,553.

*To all whom it may concern:*

Be it known that I, GEORGE G. SCHROEDER, a citizen of the United States, residing at Washington, in the District of Columbia, have invented certain new and useful Improvements in Elevated Electric Tramways, of which the following is a specification.

This invention has relation to elevated electric tramways especially adapted to be used for transportation purposes; and it consists in the novel construction and arrangement of its parts, as hereinafter shown and described.

The object of the invention is to provide a tramway of the nature as indicated to be used for transporting mail and express or freight matter from point to point. To accomplish this, a rigid or inflexible track is supported upon vertical supports. The said track is composed of rails which are substantially cruciform in cross-section, and hence by their formation are braced against the strains usually met with in such constructions. The supports for the track are isosceles-shaped in side elevation and are mounted at their bases upon suitable ties or foundations embedded in the ground. Supplemental trackways are mounted upon the supports at points below the track-rail and are adapted to sustain the greater portion of the weight of the cars or carriers, while the track-rail is used mainly for traction purposes and as a ground return for the electric current. Suitable bonds are provided at the ends of the track-rails. Current-wires are suspended above the trackway and are adapted to transmit the electric current to the cars or carriers. Also suitable arch supports of special construction are provided for supporting the current-wires.

The cars or carriers are of special construction and are especially adapted to be used upon trackways such as indicated. The frame of the car or carrier is provided with depending hangers, which extend down on opposite sides of the trackway and are curved up at their lower ends. The said hangers are provided with rollers which run upon the supplemental trackways, and thus retain the car or carrier in erect position upon the trackway irrespective of the unevenness of the weight of the load carried on either side of the said car or carrier. Thus it is not necessary to exercise great care to have the car or carrier properly counterbalanced upon the trackway. Cylindrical receptacles are provided to be carried by the upcurved ends of the said hangers. Said cylinders are divided by partitions into upper and lower end compartments. Each compartment is provided with a separate door, so that the contents of one compartment may be gotten at without disturbing the contents of any other compartment. The compartments at one end of the cylinder are adapted to be used for the transportation of mail, while the compartments at the opposite end of the cylinder are adapted to be used for transporting express matter. The upper compartments are intended to contain the heavier bulky packages, while the lower compartments are intended to receive the packages containing fragile articles.

Figure 2:
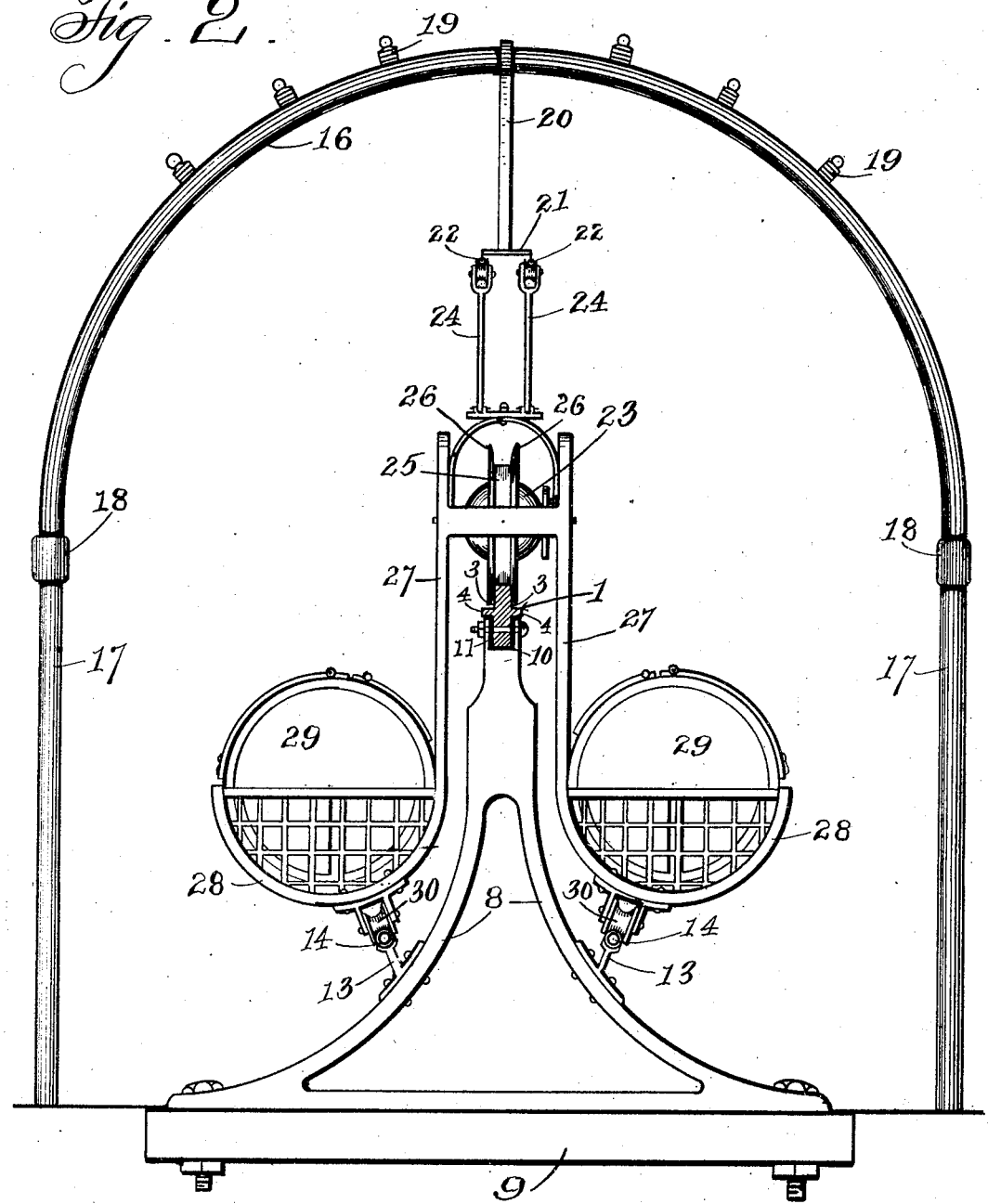
Figure 3:
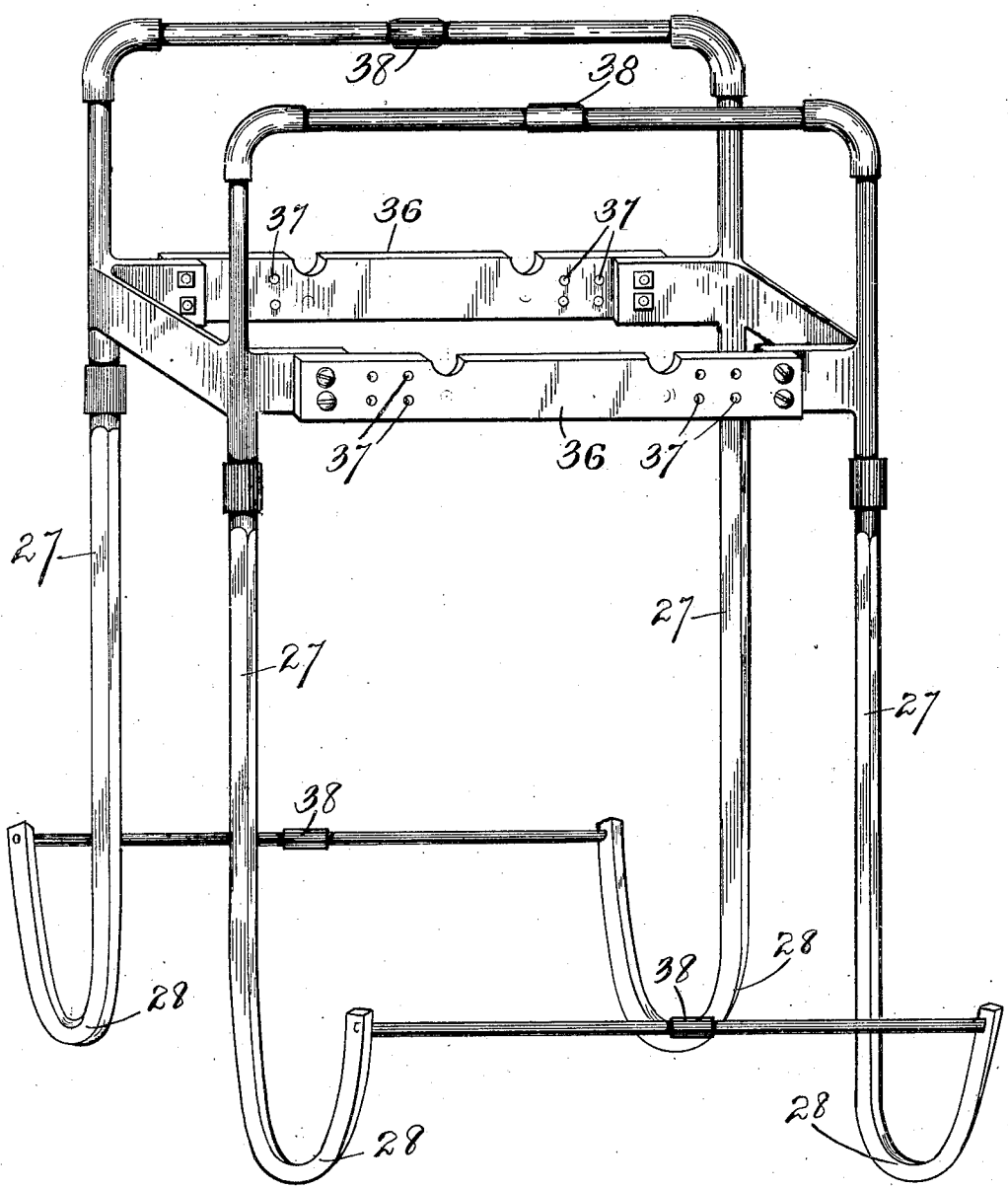
Figure 4:
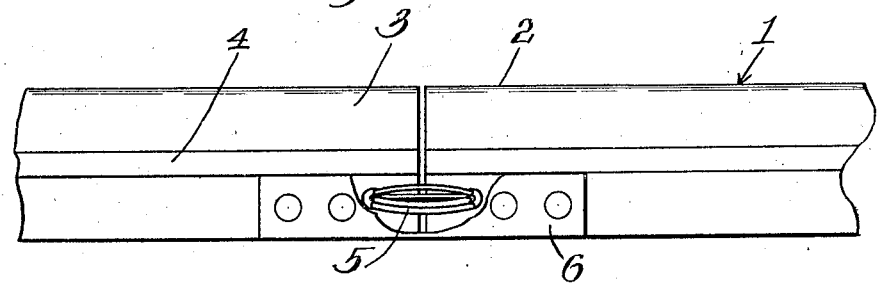
Figure 5:
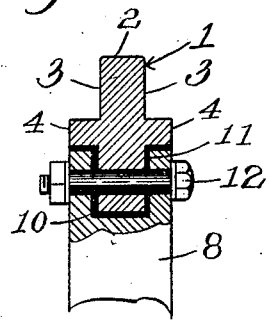
Figure 6:
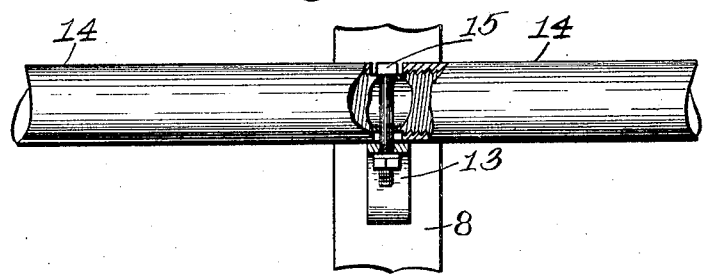
Figure 7:
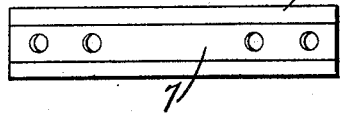
Figure 8:
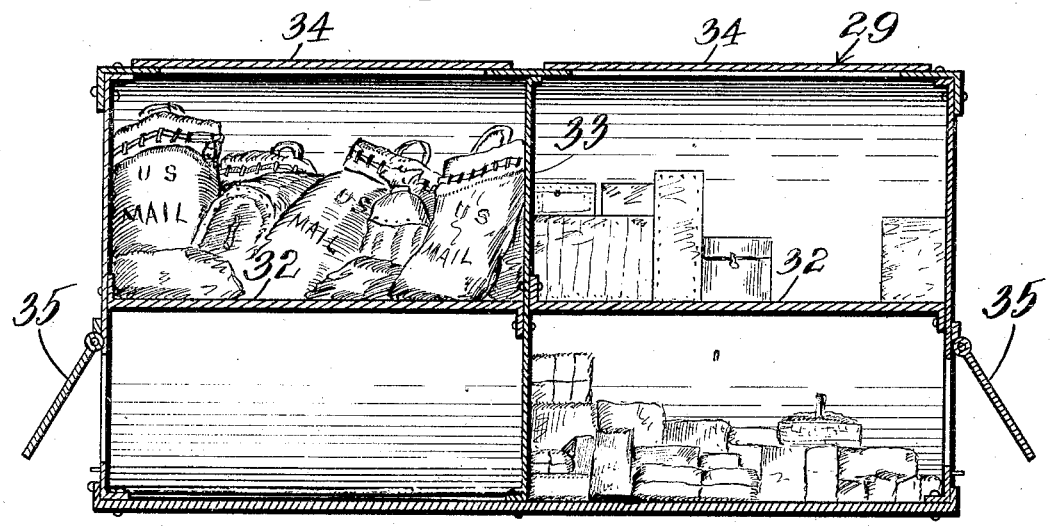
Figure 9:
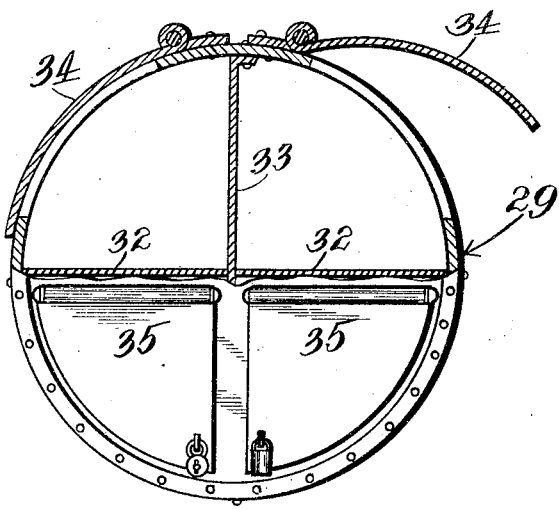

In the accompanying drawings, Figure 1 is a side elevation of a portion of the tramway, showing a carrier thereon in side elevation also. Fig. 2 is a transverse section of the tramway-track, showing the support in elevation and the current-wires support in elevation. Fig. 3 is a perspective view of a modified form of carrier-frame. Fig. 4 is a detailed enlarged side elevation of the meeting ends of the track-rails. Fig. 5 is a transverse sectional view, enlarged, of the track-rail. Fig. 6 is a detailed enlarged side elevation of the meeting ends of the supplemental rails with parts broken away. Fig. 7 is a detail enlarged side elevation of a fish-plate used upon the trackway. Fig. 8 is a longitudinal sectional view of one of the carrier-cylinders, and Fig. 9 is an end elevation of one of the carrier-cylinders with the upper portion in section.

The track-rails 1 are made cruciform in cross-section and are provided with the top traction-surface 2 and the vertically-disposed side surfaces 3 3. The cross ledges or webs 4 4 are located substantially midway between the upper and lower edges of the rail. At their ends the electric bonds 5 are provided, which are secured at their ends to the ends of the opposite or meeting rails 1 1. The fish-plates 6 6 are channeled, as at 7, and are located over the bonds 5. The channels 7 receive the said bonds, and the said plates are bolted to the lower portions of the meeting rails.

The track-rails are supported by the uprights 8, which are substantially isosceles in shape in side elevation and which rest at their bases upon the ties 9 or other foundations suitably embedded in the ground. The sockets 10 are formed at the upper ends of the supports 8. The lower edges of the rails 1 rest in said sockets with the insulation 11 interposed between the walls of the sockets and the said rail edges. The bolts 12 pass transversely through the upper ends of the said supports 8 and the lower portions of the rails 1.

The chairs 13 are attached to the sides of the uprights 8 and support the supplemental track 14. Said supplemental track is preferably made of pipe-sections screw-threaded together at their ends. The bolts 15 are countersunk at their heads in the supplemental track 14 and pass through the chairs 13 and form an attaching means for the said supplemental track. The arches 16 are supported at the upper ends of the posts 17 17 and are connected at their ends to the upper ends of the said posts by means of the unions 18 18. The said arches extend over the track 1.

The telegraph or telephone wire-supporting pins 19 19 are mounted upon the arches 16. The hangers 20 depend from the centers of the arches 16 and are provided at their lower ends with the cross-arms 21, which support at their ends the current-wire 22 22. The said wires 22 extend parallel to the track 1.

The motor 23 and its attachments are of especial construction to travel upon the track herein described. The said motor is provided with the usual trolley-arm 24, the wheels of which run against the under sides of the current-wires 22. The traction-wheels 25 of the motor are arranged in tandem and travel upon the traction-surface 2 of the rails 1. The said wheels are provided with the side flanges 26 26, which bear against the side surfaces 3 3 of the said track and prevent any tendency on the part of the motor to lateral rock. The hangers 27 27 depend from the frame of the motor 23 and extend down on each side of the track 1. The lower ends of the said hangers 27 are upwardly hooked, as at 28, and are adapted to receive and support the cylinders 29. The under sides of the hangers 27 are provided with the rollers 30 30, which travel upon the supplemental trackways 14 14 and prevent the weight of the load carried by a cylinder 29 on either side of the track 1 from canting the vertical axis of the motor 23 with relation to the track 1. The lower ends of the hangers 27 are provided with the fretwork 31, and in some instances the said rollers may be attached to the said fretwork instead of directly to the lower ends of the hangers.

The cylinders 29 are divided by the horizontal partition 32 into upper and lower compartments and by the transverse partition 33 into end compartments. The upper compartments are provided with the doors 34 34, which are hinged to the sides of the cylinders, and the lower compartments are provided with the doors 35 35, which are hinged to the ends of the cylinders. The compartments at one end of the cylinder are adapted to receive and contain mail-matter, while the compartments at the opposite end of the cylinder are adapted to receive and contain expressage. The top compartments hold articles of a durable nature, and the bottom compartments hold fragile articles. The contents of one compartment may be reached without disturbing the contents of any other compartment.

In the form of the invention as shown in Fig. 3 the side bars 36 of the frame of the motor are provided at their ends with the series of perforations 37 37 and the upper and lower horizontal rods with the connections 38 38, by means of which the portion of the front and rear hangers may be adjusted with relation to each other.

From the foregoing description it is obvious that as the motor travels upon the track 1 the rollers 30 30 will travel upon the supplemental tracks 14 14 and that the weight of the loads carried by the hangers 27 will be borne principally by the said supplemental tracks, while the track 1 will be used principally for traction purposes. By this arrangement it is not necessary to exercise care to have the load properly counterbalanced upon the track 1.

The wires 22 22 are used for the purpose of transmitting the electric current to the motor, while the track 1 is used as a ground-return for the current. The chairs 13 13 are disposed toward the centers of the cylinders 29 29, and consequently the weight of the said cylinders is in a direct thrust against the said chairs. The parts are so arranged that the possibility of any tendence to lateral sway or rock when the cylinders are loaded or empty is positively prevented.

Having described my invention, what I claim as new, and desire to secure by Letters Patent, is—

1. A tramway comprising isosceles supports having their upper ends provided with sockets, rails having depending webs fitting within said sockets and lateral flanges resting upon the top edges of said sockets, supplemental rails secured to opposite sides of said supports below the first-mentioned rails, and current-wires extending parallel with said rails 2. A tramway comprising isosceles supports having their upper ends provided with sockets, cruciform rails secured in said sockets, supplemental rails secured to opposite sides of said supports below the first-mentioned rails, and current-wires extending parallel with said rails.

3. A tramway comprising isosceles supports having their upper ends provided with sockets, rails having depending webs fitting in said sockets, securing-bolts passed through said sockets and the webs of said rails, supplemental rails secured to opposite sides of said support below the first-mentioned rails, and current-wires extending parallel with said rails.

4. A tramway comprising isosceles supports having sockets, rails having depending webs fitting in said sockets, supplemental rails secured to opposite sides of said isosceles supports, arches independent of said supports and spanning the same, and current-wires supported by said arches.

5. A tramway comprising isosceles supports having their upper ends provided with sockets, rails having depending webs fitting within said sockets, and lateral flanges resting upon the top edges of said sockets, diverging chairs secured to opposite sides of said supports, supplemental tracks secured to said chairs, and current-wires extending parallel with said tracks.

6. A tramway comprising isosceles supports having their upper ends provided with sockets, rails having depending webs fitting within said sockets, diverging chairs secured to opposite sides of said supports, supplemental tracks formed of piping united to form continuous rails, and means for securing said piping to said chairs.

7. A tramway comprising isosceles supports provided with concaved sides and having their upper ends provided with sockets, rails having depending webs secured in said sockets, and lateral flanges resting upon the top edges of said sockets, supplemental tracks secured to the concaved sides of said supports, and current-wires extending parallel with said tracks.

8. A tramway comprising upright support, rails carried by the upper ends of said supports, supplemental rails mounted below the first-mentioned rail, a carrier having traction-wheels adapted to travel on the first-mentioned rail and provided with depending hangers spanning said supports and having their lower ends constructed to receive the load to be transported, and rollers on said hangers engaging said supplemental rails.

9. A tramway comprising upright supports, rails carried by the upper ends of said supports, supplemental rails supported below the first-mentioned rails, a carrier having traction-wheels engaging the first-mentioned rail, said carrier being also provided with depending hangers spanning said supports and provided with upwardly-hooked portions to support the load to be transported, and rollers on said hangers engaging the supplemental rails.

10. A tramway comprising upright supports, rails carried by the upper ends of said supports, supplemental rails supported below the first-mentioned rails, an adjustable carrier having traction-wheels engaging the first-mentioned rails, said carrier being also provided with depending hangers spanning said support and constructed to receive the load to be transported, and rollers on said hangers engaging the supplemental rails.

11. A tramway comprising an elevated track, supplemental tracks supported in parallel relation to the first said track, current-wires supported in parallel relation to the said tracks, a carrier having traction-wheels adapted to travel upon the first said track, hangers depending from said carrier on opposite sides of the first said track, cylinders carried by said hangers, and rollers attached to the hangers and adapted to travel upon the supplemental tracks.

12. A tramway comprising an elevated track, supplemental tracks supported in parallel relation to the first said track, current-wires supported in parallel relation to the said tracks, a carrier having traction-wheels adapted to travel upon the first said track, hangers depending from said carrier on opposite sides of the first said track, cylinders carried by said hangers and being divided by partitions into compartments, each said compartment having a door-closed opening leading into the same, and rollers attached to the hangers and adapted to travel upon the supplemental tracks.

In testimony whereof I have signed my name to this specification in the presence of two subscribing witnesses.

GEORGE G. SCHROEDER.

Witnesses:
C. L. MILLARD,
F. LIEBSCHUTZ.